July 11, 1944.                A. SEARLES ET AL                2,353,510
                        IDLER ROLLER FOR BELT CONVEYERS
                            Filed June 30, 1942
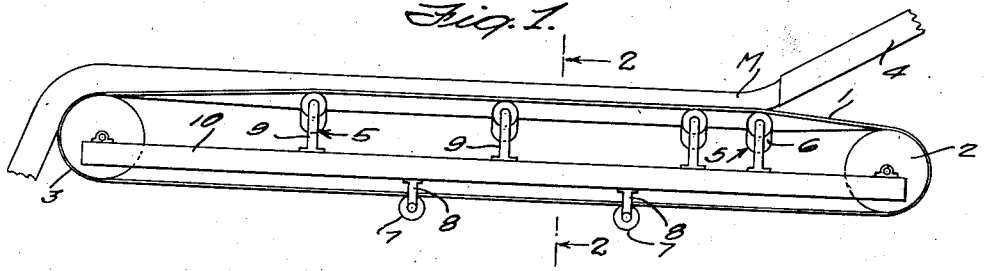
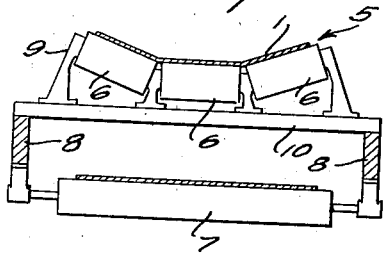
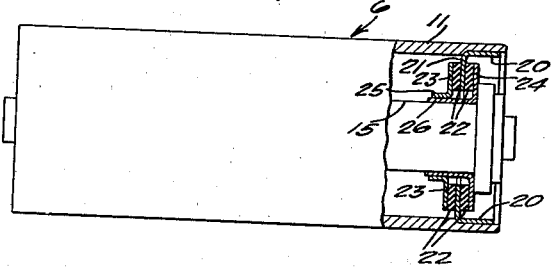
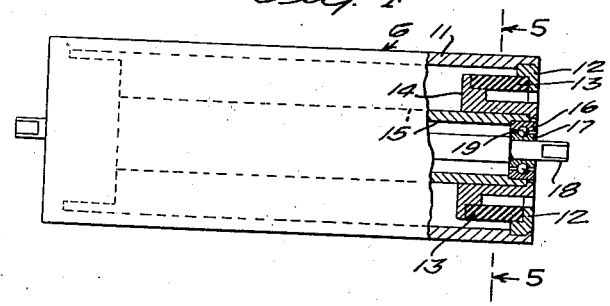
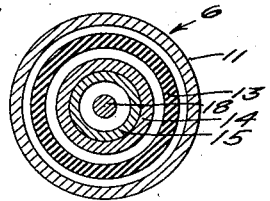
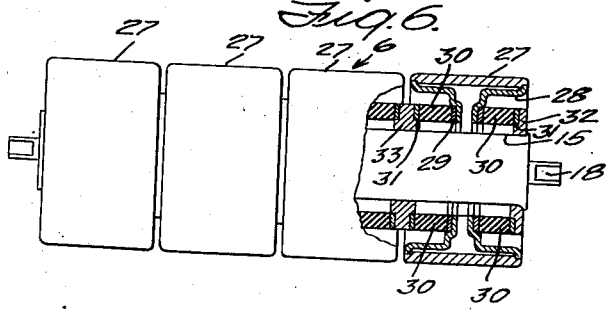
INVENTORS
AMOS SEARLES
CHARLES A. SWARTZ
BY
ATTORNEYS Patented July 11, 1944

2,353,510

UNITED STATES PATENT OFFICE 2,353,510

IDLER ROLLER FOR BELT CONVEYERS

Amos Searles, Moscow, Pa., and Charles A. Swartz, Yonkers, N. Y.

Application June 30, 1942, Serial No. 449,110

6 Claims. (Cl. 74—230.1)

This invention relates to the construction of idler rollers for flexible belt conveyers, especially those idlers which support the load carrying stretch of the conveyer belt and more particularly those idlers which support the belt in the region where the load is applied thereto. Such conveyer belts are extensively used to transport lumps or masses of ore, rocks, coke or other material which is discharged onto the belt or directed onto it from a feed chute. The impact caused by the sudden application of such a load to a conveyer belt tends to cause it to be bent to an excessive degree and even torn apart in the region where the load is applied thereto with the result that the belt rapidly becomes worn away. Such sudden impacts may also be caused by heavy lumps of material that become displaced from their original positions on the belt due to the belt sagging between the successive idler rollers which support it, in some cases such heavy lumps falling off material underlying them on the belt and striking the belt. It is a main purpose of the present invention to greatly increase the life of such a conveyer belt by greatly reducing the extent to which the belt is flexed or distorted from its normal shape by the sudden depositing of a load thereon. This object is secured by the provision of belt supporting idler rollers which contain a cushioning medium of resilient material which is so arranged as to yield and absorb a substantial portion of the shock due to the sudden application of the load; the yielding of the resilient material correspondingly reducing the amount by which the belt is flexed or distorted from its normal position.

As a feature of the present invention, the cushioning elements are so constructed and mounted with respect to the outer roller shell that any impact on the shell is transmitted to these cushioning elements in shear throughout their cross-section in planes transverse to the axis of the shell. By subjecting the cushioning elements to shear rather than pure compression as in the usual type of idler rollers, greater deflection is afforded for an equal volume of the resilient material. Also, by subjecting the cushioning elements to shear, these elements are stressed substantially uniformly.

As another feature of the present invention, the cushioning element and the structures by which said element is attached to the central structure and outer shell of the roller form a self-contained unit which may be assembled in the shell or removed therefrom as such.

Various other objects, features and advantages of the invention will be apparent from the following particular description, and from an inspection of the accompanying drawing, in which:

Fig. 1 is a front view of a conveyer belt showing also its supporting rollers and a portion of a chute for delivering material onto the belt;

Fig. 2 is a transverse sectional view of the conveyer belt and rollers of Fig. 1 taken on the line 2—2 thereof;

Fig. 3 is a longitudinal view, partly in section, showing the construction of one of the idler rollers of Fig. 1 on an enlarged scale embodying the invention;

Fig. 4 is a longitudinal view, partly in section, showing the construction of an idler roller embodying the invention;

Fig. 5 is a transverse sectional view of the idler roller of Fig. 4 taken on the line 5—5 thereof; and Fig. 6 is a longitudinal view partly in section showing the construction of another form of idler roller embodying the invention.

Referring to Figs. 1 and 2, the invention is shown in connection with a conveyer having a conveying belt 1 which passes over a foot wheel 2 and a head wheel 3, the foot wheel 2 being disposed under a load chute 4 which discharges the material to be conveyed onto the belt. The upper reach of the belt passes over a plurality of similar idler units 5 each comprising three similar idler rollers 6 disposed with their axes at angles to each other so as to trough the belt to prevent the material M being conveyed from spilling off the belt. While each idler unit 5 is illustrated as having only three idler rollers, it will be understood that a greater number of rollers may be utilized, each roller being disposed at an angular relation to the next adjacent roller thereby increasing the number of bends in the width of the belt. The belt 1 may be driven by rotating the head wheel 3 by means of suitable gearing from a source of power (not shown) and the lower reach of the belt returns to the foot wheel 2 over the idler rollers 7 which are rotatably mounted in supporting brackets 8. The idler rollers 6 are shown supported in brackets 9 which are designed to support the individual rollers at the desired angular relation with each other. The foot wheel 2, head wheel 3 and the brackets 8 and 9 are supported by a common supporting structure 10 which extends throughout the length of the conveyer. While the belt 1 is shown troughed, it will be understood that the invention is also adapted for use with flat conveyer belts of the type used for conveying packages or small articles in which case the idler roller or rollers 6 in each idler unit 5 will be arranged horizontally, or roller conveyer having no conveying belt but in which the packages or articles engage the rollers themselves and are transferred by gravity.

Referring to Figs. 4 and 5 each idler roller 6 is shown as comprising an outer tubular sleeve or shell 11 formed of thin steel or other suitable rigid material to each end of which is attached a metal ring 12, the construction at only one end of the roller 6 being shown in detail but it will be understood that the construction at the opposite end is identical with that shown. To the inner face of the ring 12 is attached one end of an elongated cylindrical rubber ring or tube 13 whose opposite end is attached to a supporting ring 14 which in turn is attached to an elongated metal tube 15. Each end of tube 15 is secured to the outer race 16 of a ball bearing, the inner race 17 being secured to a central supporting spindle or shaft 18 which is non-rotatably mounted in the bracket 9. The usual steel balls 19 are interposed between the bearing races 16 and 17. The ends of the rubber ring 13 are firmly secured to the metal rings 12 and 14 by any suitable means as, for example, by vulcanization. As the belt 1 passes over the idler rollers 6 disposed under the mouth of the chute 4, it is subjected to the impact of the material M and by reason of its flexibility the belt partially cushions this impact. As an important feature of the invention, this cushioning effect of the belt 1 is supplemented by the cylindrical rubber tubes 13, each of which has the outer periphery of its intermediate section spaced radially inwardly from the inner periphery of the shell 11, and is mounted so as to be subjected to shear throughout its circular cross-section in the planes transverse to the axis of said shell. Since the tubular sleeve 11 has a relatively small mass and inertia, it responds quickly to the impact so that the applied force is quickly transferred to and absorbed by the resilient material of the tubes or rings 13. Soon after the applied force is removed, the natural resiliency of the rings 13 causes them to resume their normal position and the tubular sleeve 11 is moved upwardly returning the adjacent portion of the belt to its original position. The term "rubber" is used herein to refer to natural rubber or any one of the known synthetic rubbers.

In the form of the invention shown in Figure 3 the tubular sleeve or shell 11 of the idler roll has attached to each end a metallic ring 20 provided at its inner end with a radially directed flange 21. The opposite faces of this flange are secured by vulcanization or other suitable means to the inner faces of a pair of rubber rings 22 whose outer faces are secured by vulcanization or otherwise to the radially disposed flanges 23, 24 of a pair of telescoping hub members 25, 26 which are mounted on the periphery of a metal tube 15 of the type shown in Fig. 4. The tube 15 may be provided at its opposite ends with ball bearings and supporting means similar to those shown in Fig. 4 and which it is, therefore, not necessary to illustrate herein. In this form of the invention the impact of the material transferred by the belt to the thin sleeve 11 is absorbed by the rubber rings 22 whose inner faces are displaced downwardly by the radial flange 21 in response to the applied load, thereby relieving the conveyer belt of the full force of the impact.

In the construction of Fig. 3, the outer periphery of the intermediate section of each cushioning ring 22 is spaced radially inwardly from the inner periphery of the shell or sleeve 11, and any impact on said shell is transmitted to this ring in shear throughout its circular cross-section in planes transverse to the axis of the shell.

Figure 6 shows an embodiment of the invention in which the idler roller 6 is composed of a plurality of connected sections all mounted on the tube or sleeve 15. Each section comprises a thin metal sleeve or shell 27 whose ends are secured to a pair of hub members 28 of the form shown. Attached to the inner portions of the hubs 28 are a pair of thin metal rings 29 which are in turn secured to the ends of a pair of rubber rings or tubes 30. The opposite ends of the rings 30 are secured to a pair of thin metal rings 31, which are disposed in recesses provided in the radially disposed supporting hubs 32, 33, the latter being secured to the periphery of sleeve 15. The attachment of the rubber rings 30 to the metal rings 31 may be by vulcanization or other known means. This form of the invention presents the additional advantage that the several sleeves 27 support the belt throughout substantially a continuous portion of its entire width while at the same time permitting one of the sleeves 27 to be displaced downwardly and thereby take up a major portion of the shock which may be applied to a limited area of the belt as, for example, by a large lump of ore being deposited on the belt from the chute 4, Fig. 1. This displacement of a sleeve 27 will be almost instantaneous due to its small mass and inertia so that the rubber rings 30 quickly absorb a large part of the impact which would otherwise put a severe strain on a limited area of the belt tending to unduly distort it or even to tear it apart. It is also to be noted that although one of the sleeves 27 may be depressed under the sudden load and assume a position eccentric to the remaining sleeves, yet it rotates at the same peripheral speed as the other sleeves, so that there is no increase in slippage with the belt produced such as would tend to wear away the lower surface of the belt.

In the construction of Fig. 6, each rubber ring 30 has the outer periphery of its intermediate section spaced radially inwardly from the inner periphery of the shell or sleeve 27, and is subjected to shear as in the constructions of Figs. 3, 4 and 5 when loaded.

It should be noted that in all of the constructions shown, the cushioning elements are connected with their supporting structures to form therewith a self-contained unit which may be inserted in the shell or removed therefrom as such.

We have described what we believe to be the best embodiments of our invention. We do not wish, however, to be confined to the embodiments shown, but what we desire to cover by Letters Patent is set forth in the appended claims.

We claim:

1. A roller adapted for the resilient support of a conveyer belt comprising an outer shell of rigid material, a central structure for supporting said shell for rotation about its axis, a cushioning ring of resilient material arranged near each end of said shell around said structure and having the outer periphery of its intermediate section spaced radially inwardly from the inner periphery of said shell, a rigid member engaging said central supporting structure near each end of said shell and rigid with an end portion of the adjacent ring for supporting said latter ring on said central supporting structure, and a second rigid member engaging said shell near each end thereof and rigid with the other end portion of the latter ring to transmit in shear to said latter ring the transverse movement of said shell relative to said central supporting structure.

2. A roller as described in claim 1, in which the rigid members are annular in shape and are rigidly secured to the end axial faces of said cushioning rings.

3. A roller as described in claim 1, in which the cushioning rings have the inner peripheries of their intermediate sections spaced radially outwardly from said central supporting structure, and said rings are subjected to shear in planes transverse to the axis of the shell upon transverse movement of said shell relative to said central supporting structure.

4. A roller as described in claim 1, in which two adjoining cushioning rings are arranged near each end of said shell, and said second rigid member has a flange extending radially inwardly between said adjoining rings and are rigidly secured to the inner adjoining end faces of said rings, and in which two rigid members are provided near each end of said shell engaging said central supporting member and secured rigidly to the outer end faces of said latter rings.

5. A roller as described in claim 1, in which each cushioning ring and each pair of corresponding rigid members conjointly form a self-contained unit which may be fitted in said shell or removed therefrom as a unit.

6. An idler roller adapted for the resilient support of a conveyer belt comprising an outer shell of rigid material, a central structure for supporting said shell for rotation about its axis, a pair of adjoining rubber rings near each end of said shell radially spaced from said shell and from said central supporting structure, an annular rigid member having its outer peripheral section engaging said shell and having a flange extending radially inwardly between adjoining rings and vulcanized to the inner facing ends of said latter rings, and a pair of rigid members having telescoping tubular sections which embrace said central structure and having respective radially outwardly extending flanges vulcanized to the outer ends of said latter rings respectively, each pair of adjoining rings and corresponding rigid members vulcanized thereto forming a self-contained unit which may be assembled in said shell or removed therefrom as such.

CHARLES A. SWARTZ.
AMOS SEARLES.